United States Patent [19]

Keane

[11] Patent Number: 4,509,227
[45] Date of Patent: Apr. 9, 1985

[54] THREE-PIECE SWIVEL CASTER HAVING A FORCE TRANSFER ROLLER

[75] Inventor: James W. Keane, Ramsey County, Minn.

[73] Assignee: Whirlpool Corporation, Benton Harbor, Mich.

[21] Appl. No.: 429,843

[22] Filed: Sep. 30, 1982

[51] Int. Cl.³ ............................................. B60B 33/00
[52] U.S. Cl. ...................................... 16/23; 15/327 F; 16/45; 16/DIG. 27; 16/DIG. 40
[58] Field of Search ............... 16/20, 22, 23, 27, 31 R, 16/31 A, 37, 38, 39, 48, 386, DIG. 27, DIG. 40, 45; 15/327 F

[56] References Cited

U.S. PATENT DOCUMENTS

| | | | |
|---|---|---|---|
| 42,338 | 4/1864 | Beach | 16/23 |
| 145,769 | 12/1873 | Waitt | 16/22 |
| 174,794 | 3/1876 | Fisher, Jr. | 16/38 |
| 257,834 | 5/1882 | Scott et al. | 16/23 |
| 408,656 | 8/1889 | Dicke | 16/48 |
| 1,275,882 | 8/1918 | Ellison . | |
| 1,555,839 | 10/1925 | Fries et al. . | |
| 1,645,831 | 10/1927 | Tiedemann | 16/23 |
| 2,437,588 | 3/1948 | Baum . | |
| 3,231,926 | 2/1966 | Stollman | 16/22 |
| 3,766,594 | 10/1973 | Westergren et al. . | |
| 3,818,541 | 6/1974 | Daniels | 16/48 |
| 4,054,964 | 10/1977 | Kaneko | 16/23 X |
| 4,057,872 | 11/1977 | Schmidt . | |
| 4,076,346 | 2/1978 | McMahan, Sr. | 16/20 X |
| 4,254,532 | 3/1981 | Hager . | |

FOREIGN PATENT DOCUMENTS

| | | | |
|---|---|---|---|
| 294955 | 8/1967 | Australia | 16/20 |
| 352113 | 3/1961 | Switzerland | 16/31 R |
| 114917 | 4/1918 | United Kingdom | 16/23 |

Primary Examiner—Fred A. Silverberg
Attorney, Agent, or Firm—Wood, Dalton, Phillips, Mason, & Rowe

[57] ABSTRACT

A swivel caster structure having a base arranged for swivel mounting to a mounting portion of a device to be carried thereby. The base rotatively carries a caster wheel. A force transfer element is carried by the base for transmitting an overlying load vertically downwardly directly toward the caster wheel mounting axis. In one form, the force transfer element is a roller having an axis of rotation inclined to the horizontal and defining a peripheral frustoconical surface extending at the same angle to the axis of the roller so as to have rolling line contact with the superjacent housing wall in transferring the load downwardly to the roller. In another form, the force transfer element is a fixed bearing mounted in a suitable recess in the caster base and having a segmentally cylindrical surface having a sliding line contact with the superjacent housing wall. The swivel caster structure is preferably formed of molded synthetic resin having low surface friction for improved swiveling caster operation.

7 Claims, 7 Drawing Figures

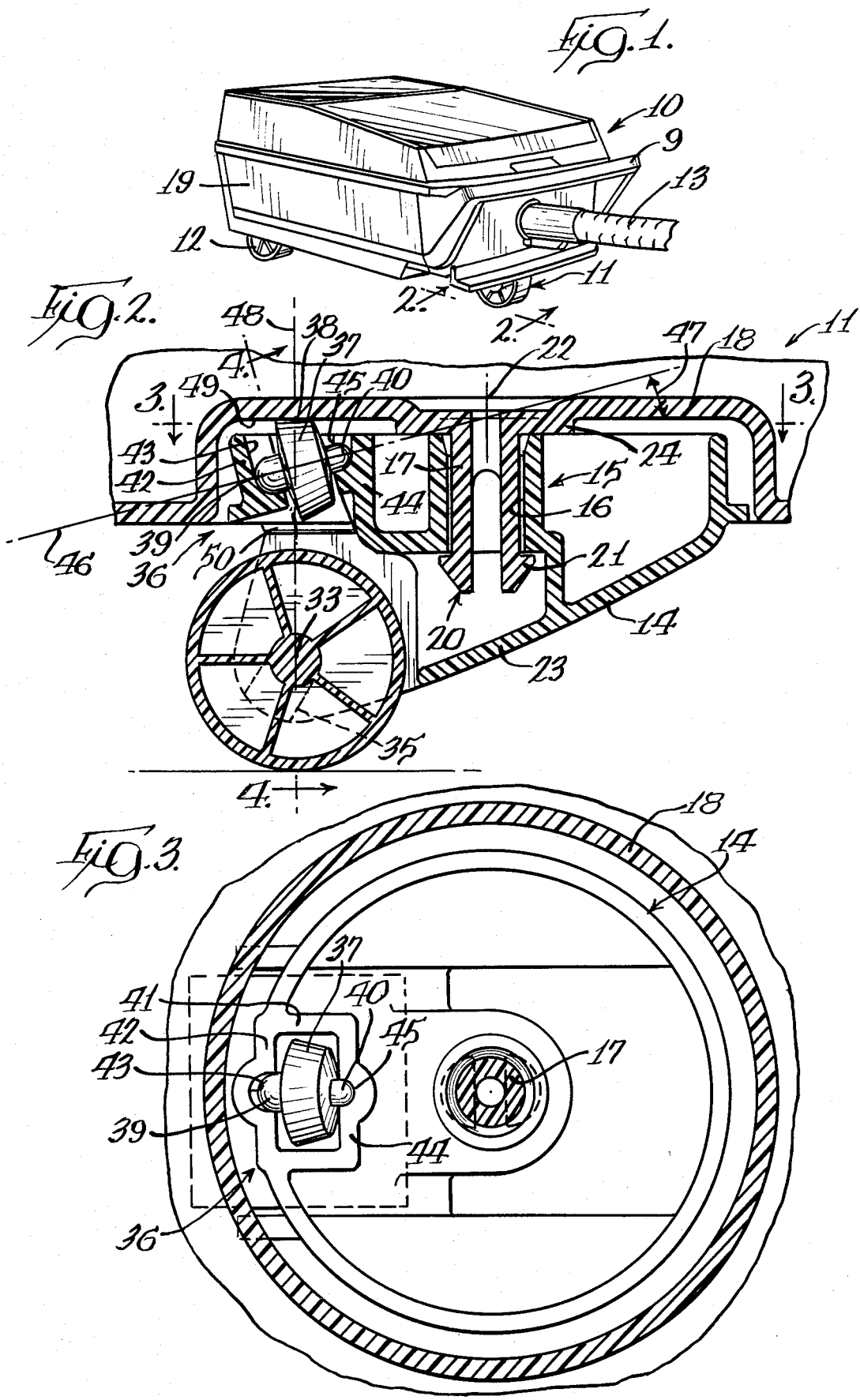

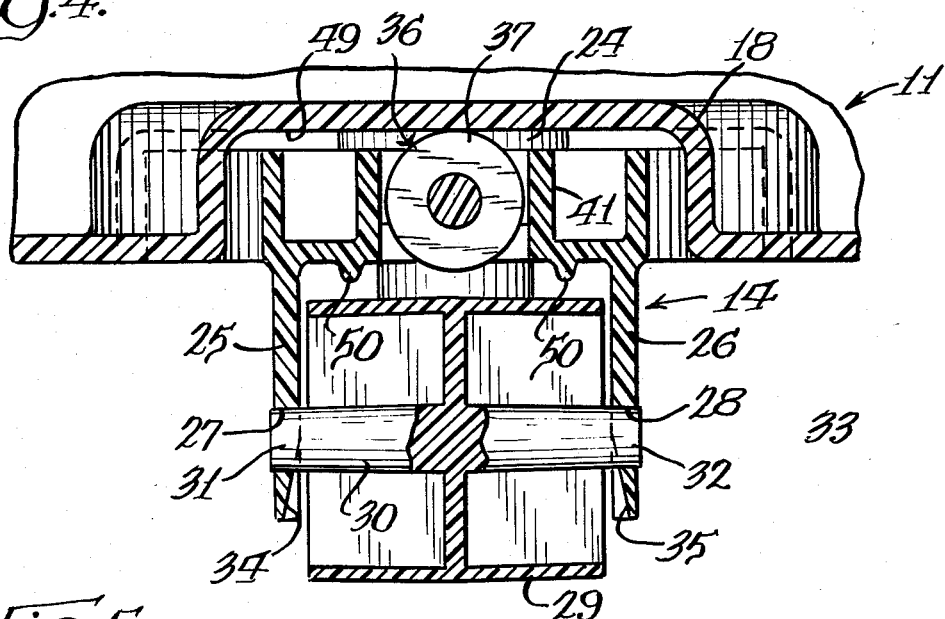
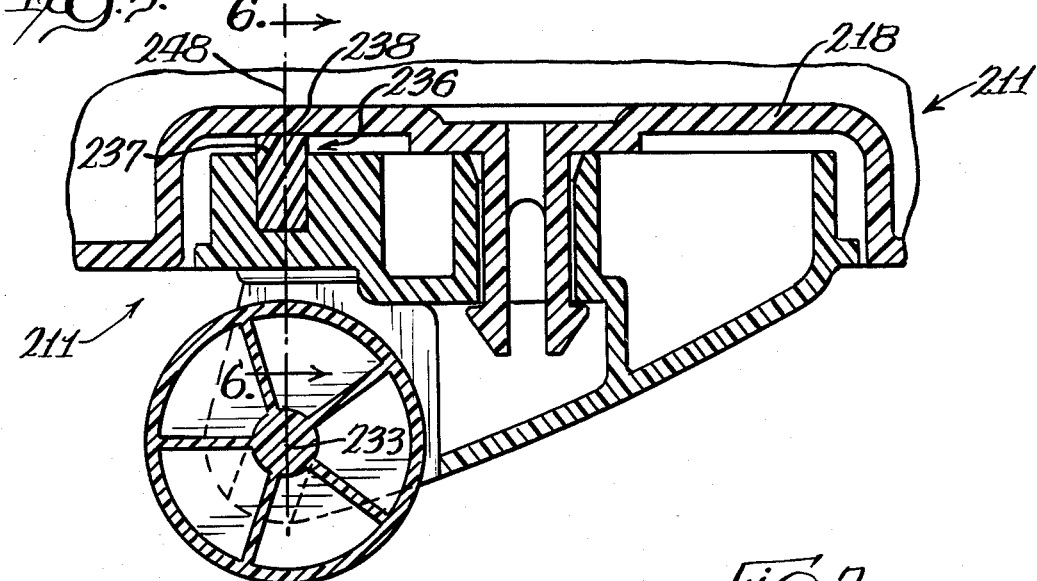
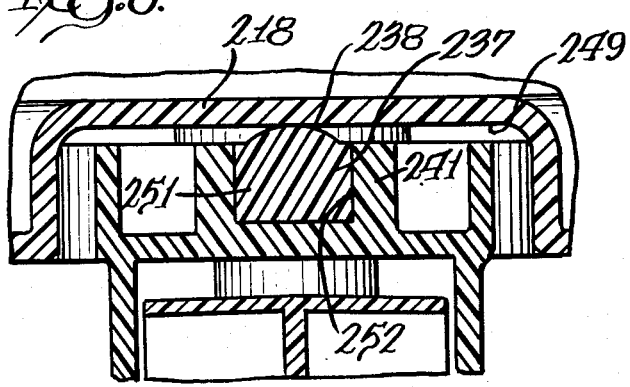
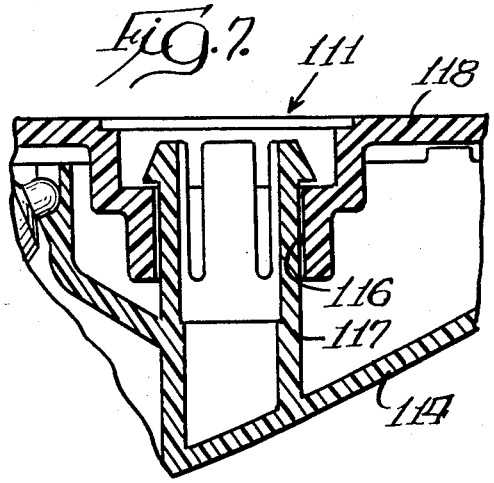

THREE-PIECE SWIVEL CASTER HAVING A FORCE TRANSFER ROLLER

BACKGROUND OF THE INVENTION

1. Field of the Invention

This invention relates to swivel caster structures and in particular to swivel caster structures such as adapted for use in canister vacuum cleaners and the like.

2. Description of the Background Art

In U.S. Pat. No. 257,834, John Scott et al disclose a caster provided with an antifriction wheel having a rounded periphery rolling against a beveled surface of a mounting case. The wheel is journaled in the caster support by a shaft pin having a lower end extending to substantially above the caster wheel axis.

In U.S. Pat. No. 1,555,839, Robert G. Fries et al disclose a caster structure having an upstanding stud set into the support thereof, having a height to bear against the underside of the overlying support plate so as to provide a slight springing of the parts together.

In U.S. Pat. No. 1,645,831, A. Henry Tiedemann discloses a caster having a frustoconical support disposed upwardly of the vertical plane of the caster wheel axis.

In U.S. Pat. No. 3,766,594 of George A. Westergren et al, which patent is owned by the assignee hereof, a canister vacuum cleaner is illustrated having a swivel caster for providing facilitated following movement of the canister in the use of the vacuum cleaner.

SUMMARY OF THE INVENTION

The present invention comprehends an improved swivel caster structure for use in a device, such as a canister vacuum cleaner, having improved force transfer means for transmitting the load of the device directly downwardly to the caster wheel axle axis away from the swivel axis for improved long life, low friction rolling movement of the device, as on a subjacent floor.

In the illustrated embodiment, the force transfer element is carried by the base of the swivel caster structure, and in one form, comprises a roller, axle means associated with the roller for journaling the roller on the base with the axle means defining a rolling axis inclined at an acute angle to the horizontal and with a lower end of the axle means being spaced further from the swivel axis than a vertical plane extending through the wheel mounting axis.

In the illustrated embodiment, the axle means includes an upper end projecting coaxially to the lower end.

In the illustrated embodiment, the lower end is constructed to have a substantially greater strength than the upper end, and in the illustrated embodiment, has a diameter substantially larger than that of the upper end.

The base includes a protective wall underlying the swivel support.

The base further includes strengthening ribs overlying the caster wheel.

The base is provided with guide means for guiding the oppositely projecting axle elements associated with the caster wheel into opposed bearing openings on the support.

In the illustrated embodiment, the swivel caster is formed of a molded synthetic resin providing low friction contact surfaces.

In another form, the force transfer element comprises a roller having a frustoconical periphery, axle means projecting from opposite sides of the roller, and bearing means on the base for rotatively supporting the axle means, the axle means and bearing means being constructed to permit installation of the roller on the base with the frustoconical periphery moving in only on preselected axial direction.

In the illustrated embodiment, the bearings comprise upwardly opening recesses formed in the base.

In the illustrated embodiments, the swivel support is defined by a swivel post extending downwardly from the overlying member through a swivel opening in the caster base.

In a modified form, the transfer element comprises a bearing element projecting upwardly from the base in substantial vertical alignment with the center of the caster wheel axis.

The bearing element, in the illustrated embodiment, defines an upper, segmentally cylindrical bearing surface and a lower parallelepiped mounting portion received in an upwardly opening recess in the base.

Thus, the swivel caster structure of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a perspective view of a vacuum cleaner canister having a swivel caster embodying the invention;

FIG. 2 is a fragmentary enlarged vertical section thereof taken substantially along the line 2—2 of FIG. 1;

FIG. 3 is a horizontal section taken substantially along the line 3—3 of FIG. 2;

FIG. 4 is a vertical section taken substantially along the line 4—4 of FIG. 2;

FIG. 5 is a fragmentary vertical section similar to FIG. 2 but illustrating a caster structure having a modified form of force transfer element;

FIG. 6 is a fragmentary vertical section taken substantially along the line 6—6 of FIG. 5; and FIG. 7 is a fragmentary vertical section illustrating a modified form of swivel support utilized in the swivel caster structure.

DESCRIPTION OF THE PREFERRED EMBODIMENT

In the illustrative embodiment of the invention as disclosed in the drawing, a vacuum cleaner canister generally designated 10 is provided with a swivel caster generally designated 11 embodying the invention. As further shown in FIG. 1, the canister may be provided with rear wheels 12 which cooperate with the caster in permitting the canister to be freely moved along a subjacent floor surface or the like by a pull applied thereto through a canister handle 9 or a suction hose 13.

The present invention comprehends an improved caster structure such as illustrated in greater detail in FIGS. 2-4. As shown therein, the caster structure includes a base 14 defining a swivel portion generally designated 15. In the illustrated embodiment, swivel portion 15 defines a swivel opening 16 receiving a downwardly projecting swivel post 17 on a mounting portion 18 of the canister housing 19. The post defines a trifurcated end portion 20 with outturned end flanges 21 releasably securing the base 14 to the mounting portion 18 of the canister housing for swivel movement about a vertical swivel axis 22.

As best seen in FIG. 2, base 14 includes a lower apron 23 underlying lower end 20 of the support post. As further shown, opening 16 comprises a cylindrical opening in the tubular swivel portion 15, which is actually captured between the flanges 21 and a bearing portion 24 on housing mounting portion 18. Thus, base 14 is free to swing about the axis 22 while being maintained in an axially fixed disposition on the support post.

The forward lower end of base 14 defines a pair of parallel spaced support walls 25 and 26. Wall 25 is provided with a through opening 27 in axial alignment with a corresponding opening 28 in wall 26. The caster wheel 29 is provided with an axle 30 having a first outwardly projecting axle end portion 31 and an opposite outwardly projecting axle end portion 32 received rotatively in openings 27 and 28, respectively, for free rotation of the wheel about a horizontal wheel axis 33.

A pair of inclined slots 34 and 35 is provided in the lower ends of the walls 25 and 26, respectively, for guiding the axle ends 31 and 32 between the walls into the openings 27 and 28 in installing the wheel on the base. As shown in FIG. 4, the axle 30 is formed integrally with the wheel as a one-piece unit of molded synthetic resin.

As further illustrated, space 23 defines a force transfer portion generally designated 36 for transferring loading forces directly downwardly to the wheel axle 30 so as to effectively avoid loading the swivel 15. As shown in FIG. 2, force transfer portion 36 includes a force transfer element 37, which, in the embodiment of FIGS. 2-4, comprises a roller having a frustoconical peripheral surface 38 and oppositely projecting axle portions 39 and 40.

Force transfer portion 36 further defines a generally tubular housing 41 receiving the roller and having a front wall 42 provided with an upwardly opening recess 43 defining a bearing for the first axle portion 39, and a rear wall 44 having an upwardly opening recess 45 defining a bearing for the coaxial opposite axle portion 40.

As illustrated in FIGS. 2 and 3, axle portion 39 is caused to have a greater diameter than axle portion 40 and, thus, is made to be stronger than axle portion 40. Thus, the axle portions 39 and 40 comprise axle means including stub shafts which project coaxially from opposite sides of the roller and have different diameters. As best seen in FIG. 2, bearing recess 43 is deeper than bearing recess 45, thus causing the roller axis 46 to be inclined at an acute angle 47 to the horizontal. In the illustrated embodiment, the axis is inclined at an angle of approximately 14°. The angle of the frustoconical peripheral surface 38 of roller 37 is equal to the angle 47 and, thus, in the illustrated embodiment, similarly is 14°.

The invention comprehends that the center of roller 37 be substantially directly vertically above wheel axis 33 so that as the canister is moved along the floor, the swiveling of the caster causes the roller axle portion 39 to extend rearmost as axle portion 39 is spaced from the swivel axis 22 beyond the vertical axial plane 48 of wheel axis 33.

As the recesses 43 and 45 differ in cross-sectional configuration corresponding to the diameters of the roller axle portions 39 and 40, respectively, the roller can only be installed in the base in the proper disposition so as to provide a line contact between its peripheral frustoconical surface 38 and the underlying surface 49 on the housing mounting portion 18. Thus, the axles and bearings of the roller are constructed so that the roller can only be installed on the base with the frustoconical periphery of the roller narrowing in the desired preselected axial direction.

As illustrated in FIGS. 2 and 4, base 14 is further provided with a pair of depending ribs 50 projecting downwardly from the base portion 41 for rigidifying the wheel mounting portion of the base and to limit its movement relative to the caster wheel and damage to the canister in the event a heavy load is placed on the canister above the wheel.

Thus, the swivel caster 11 provides an improved caster construction which may be readily installed to a device, such as a vacuum cleaner canister, while providing an improved transfer of force downwardly from the canister directly toward the caster wheel axis for effectively minimizing resistance to swivel movement of the swivel caster about the swivel axis 22. By disposing the peripheral surface 38 of the force transfer roller 37 in centered relationship to the vertical axial plane 48 of the wheel axis 33, optimum force transfer is provided. The invention comprehends forming the components of the swivel caster 11 of molded synthetic resin having low surface friction characteristics for providing further improved swivel caster functioning of the device.

As discussed above, the swivel portion 15 of swivel caster 11 has been disclosed as one wherein the swivel post 17 is provided on the housing portion 18 and the female swivel portion 16 is provided on the base 14. As shown in FIG. 7, the invention alternately comprehends the provision of the post 117 on the base 114 and the female mounting portion 116 of the housing portion 118. In all other respects, the swivel caster structure 111 of FIG. 7 is similar to and functions similarly to swivel caster 11.

A further modified form of swivel caster generally designated 211 is illustrated in FIGS. 5 and 6 to include a fixed force transfer element 237 comprising a bearing member having an upper segmentally cylindrical bearing surface 238 slidably engaging the under surface 249 of the housing portion 218.

As shown in FIGS. 5 and 6, the force transfer bearing 237 further includes a lower parallelepiped mounting portion 251 received in a complementary, upwardly opening parallelepiped recess 252 in a housing portion 241 of the base. As shown, the center of the bearing surface 238 is located on the vertical axial plane 248 of the wheel axis 233.

Thus, the swivel caster construction 211 of FIGS. 5 and 6 is similar to swivel caster construction 11 in all respects other than for the provision of the modified form of force transfer means 236.

Similar elements of swivel casters 11, 111, and 211 are identified by similar reference numerals but 100 different, respectively.

The foregoing disclosure of specific embodiments is illustrative of the broad inventive concepts comprehended by the invention.

I claim:

1. In a swivel caster having a base defining a swivel portion defining a vertical swivel axis and arranged for cooperation with a complementary swivel support to permit the base to be snap-fitted to the swivel support without tools and separate fasteners to swivel about said axis of said swivel portion, and a caster wheel mounting portion defining a horizontal caster wheel axis spaced from said swivel portion axis, a caster wheel journaled in said caster wheel mounting portion for rolling movement about said caster wheel axis, the improvement comprising:

a force transfer element comprising a roller having an axis of rotation and a frustoconical periphery defining an angle of approximately 14° to said axis of rotation, axle means coaxially associated with said roller for journaling said roller on said base about a fixed rolling axis defined by said axle means, said fixed rolling axis being inclined at an angle of approximately 14° to the horizontal plane and with a lower end of the axle means being spaced further from said swivel axis than is a vertical axial plane of said caster wheel axis; and means on said swivel support defining a planar downwardly facing bearing surface extending perpendicularly to said swivel axis and engaging said frustoconical roller periphery on a line of engagement for transmitting an overlying load from said support substantially solely vertically downwardly toward said caster wheel mounting axis, said line of engagement of the bearing surface with said frustoconical roller periphery being substantially bisected by said vertical plane of the caster wheel axis, said axle means and roller being cooperatively constructed to permit installation of the roller on said base with the frustoconical periphery narrowing in only one preselected axial direction, said axle means including an upper end projecting from said roller coaxially oppositely to said lower end, said lower end of the axial means defining a substantially hemispherical bearing having a radius substantially greater than the diameter of said upper end, the extension of said lower end of the axle means from said roller being less than twice said radius, said base having an upstanding wall forming a pair of spaced axle supports defining complementary lower and upper axle supporting portions and being open downwardly toward said caster wheel intermediate said axle supporting portions, said roller being maintained spaced from said lower axle supports by the engagement of the lower axle means end with said lower axle supporting portion, said caster comprising a three-piece structure formed of synthetic resin.

2. The swivel caster structure of claim 1 wherein said axle means lower end being constructed to have a substantially greater strength than said upper end.

3. The swivel caster structure of claim 1 wherein said base includes a protective wall below said swivel support for protecting a swivel post end projecting downwardly thereto.

4. The swivel caster structure of claim 1 wherein said base includes strengthening ribs overlying the caster wheel.

5. The swivel caster structure of claim 1 wherein said caster wheel includes coaxially oppositely projecting axle elements, and said base includes wall means provided with opposed bearing openings for rotatively receiving said axle elements, and opposed guide slots for guiding the axle elements along the wall means into said bearing openings.

6. The swivel caster structure of claim 1 wherein said axle supports comprise upwardly opening recesses formed in said base upstanding wall.

7. The swivel caster structure of claim 1 wherein said swivel portion of the base comprises an opening therein for receiving a swivel support post.

* * * * *